(12) United States Patent
Ogram

(10) Patent No.: US 11,521,447 B1
(45) Date of Patent: Dec. 6, 2022

(54) ANTI-SHOPLIFTING SYSTEM

(71) Applicant: Mark Ellery Ogram, Tucson, AZ (US)

(72) Inventor: Mark Ellery Ogram, Tucson, AZ (US)

( * ) Notice: Subject to any disclaimer, the term of this patent is extended or adjusted under 35 U.S.C. 154(b) by 0 days.

(21) Appl. No.: 17/300,555

(22) Filed: Aug. 16, 2021

(51) Int. Cl.
*G07C 9/20* (2020.01)
*G06K 19/06* (2006.01)
*G06V 40/16* (2022.01)

(52) U.S. Cl.
CPC ......... *G07C 9/20* (2020.01); *G06K 19/06028* (2013.01); *G06V 40/172* (2022.01)

(58) Field of Classification Search
None
See application file for complete search history.

(56) References Cited

U.S. PATENT DOCUMENTS

| | | | | |
|---|---|---|---|---|
| 6,505,774 B1 * | 1/2003 | Fulcher | | G06Q 30/0284 705/13 |
| 7,010,501 B1 * | 3/2006 | Roslak | | G06Q 20/20 705/23 |
| 8,847,761 B1 * | 9/2014 | Claudatos | | G06Q 10/087 340/572.1 |
| 10,803,432 B1 * | 10/2020 | Miles | | G06Q 20/14 |
| 11,074,431 B2 * | 7/2021 | Yamada | | G06T 7/246 |
| 2006/0072787 A1 * | 4/2006 | Claudatos | | G06Q 10/087 382/103 |
| 2011/0233274 A1 * | 9/2011 | Flanagan | | G06Q 10/10 235/377 |
| 2013/0038423 A1 * | 2/2013 | Pincu | | E05F 15/72 340/5.7 |
| 2021/0097261 A1 * | 4/2021 | Kapinos | | G06K 9/6256 |
| 2021/0144956 A1 * | 5/2021 | Bohannon | | E06B 7/32 |
| 2021/0390806 A1 * | 12/2021 | Duke | | G06K 9/00771 |

* cited by examiner

*Primary Examiner* — Carlos Garcia
(74) *Attorney, Agent, or Firm* — Mark Ogram

(57) ABSTRACT

The invention utilizes an existing cash register that, in processing the purchases, establishes an identifier (i.e. date stamp, barcode, QR code) on the receipt. This code is then used at an exit portal to trigger the opening of a barrier allowing the purchaser to leave the building. In the preferred embodiment, an image of the customer is taken on entering and leaving the building and facial recognition is made for the purpose of later apprehension or for future denial of entry into the store.

11 Claims, 3 Drawing Sheets

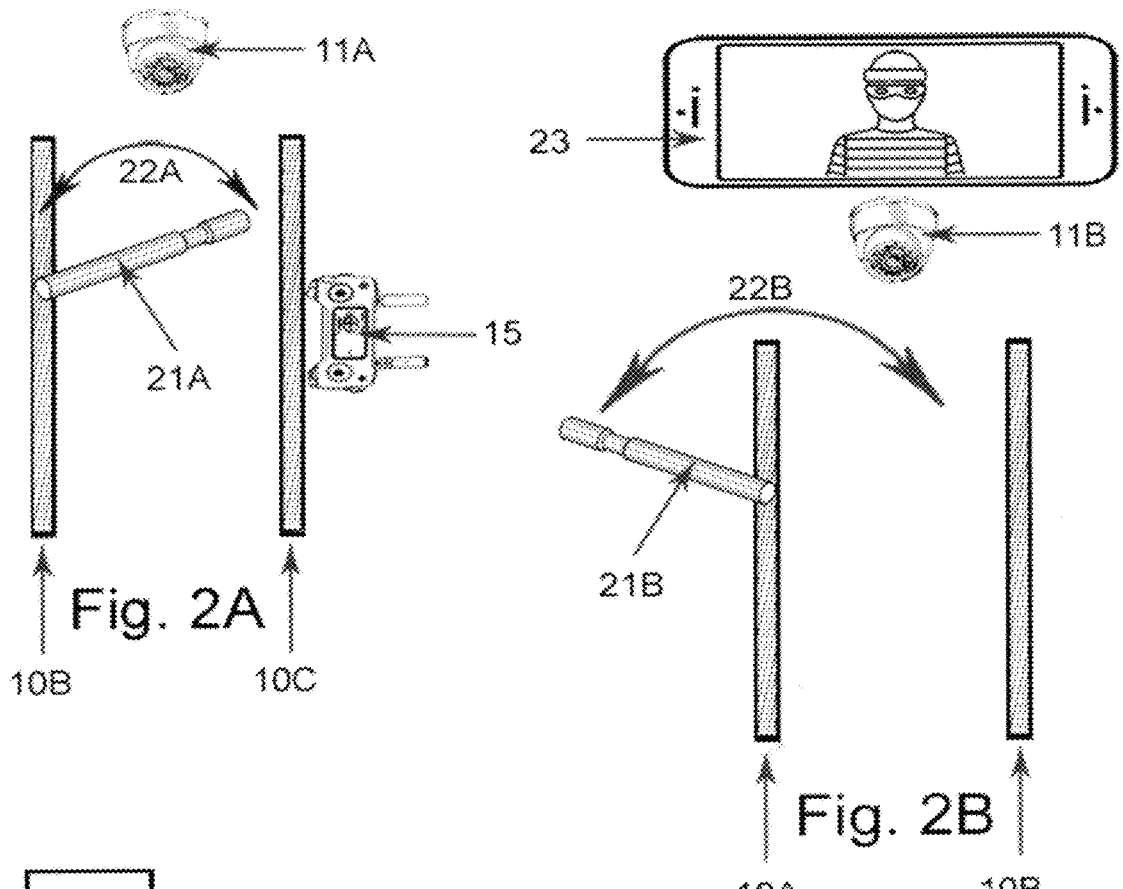
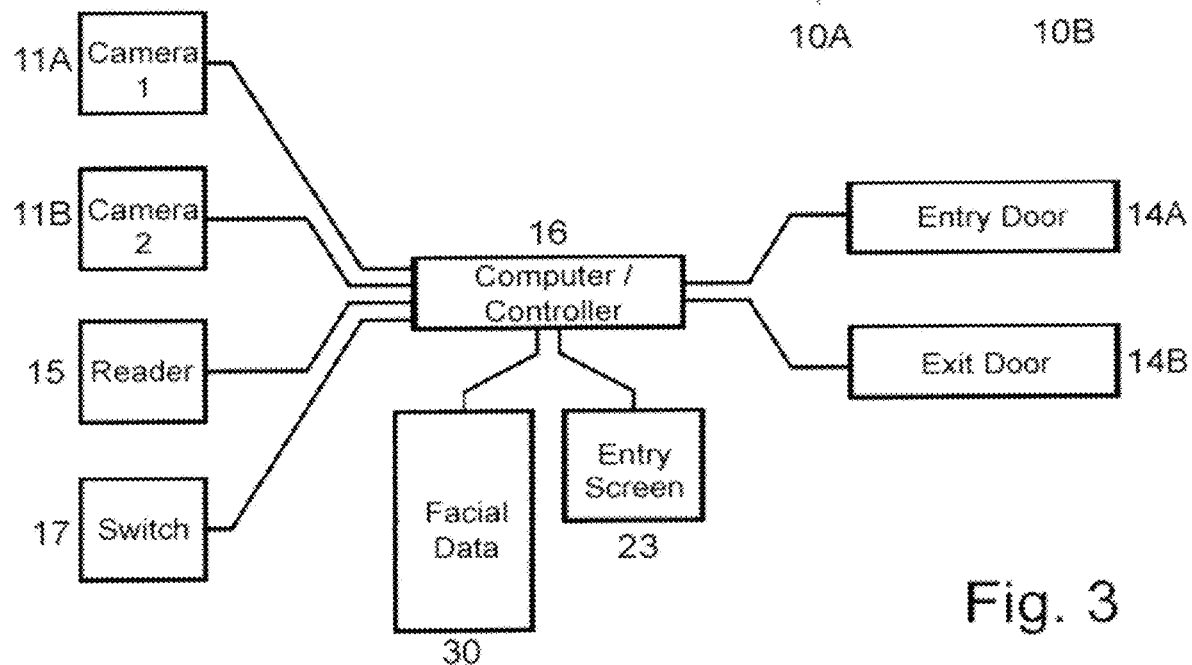

ANTI-SHOPLIFTING SYSTEM

BACKGROUND OF THE INVENTION

This invention relates generally to anti-theft mechanisms and more specifically to anti-shoplifting.

Store security has always been a priority for any retail outlet. Thefts of goods has taken many forms including the simple slipping the item into a purse, wearing the garment from the store, to grab and run with the item. As shoplifting of stores increases, the business has no alternative but to raise the prices on the goods sold to legitimate purchasers to compensate.

While historically, the shoplifting has been relatively minor in scope, a more modern problem has arisen in which groups of individuals enter the store, take what they want and either run, or in some situations, stroll out of the store.

Shopkeepers have very few options available, to confront the thieves invites violence which has resulted in the death of the shop keeper. The only real solution for the shopkeeper is to simply let the shoplifter leave the store.

This though invites further brazen thefts when the thieves know that the shopkeeper will do nothing to curtail their criminal activity.

It is clear there is a need to provide further security from shoplifting.

SUMMARY OF THE INVENTION

The invention utilizes an existing cash register for a retail store that, in processing the purchases, establishes an identifier (such as a date stamp, barcode, QR code) on the receipt. In the invention, this code/identifier is used at an exit portal to trigger the opening of a barrier allowing the purchaser to leave the building. In the preferred embodiment, an image of the customer is taken on entering and leaving the building and facial recognition is made for the purpose, in the case of a successful shoplifting, for later apprehension or for future denial of entry into the store.

The preferred embodiment of the invention uses a register commonly found in retail stores. The register is configured to process a purchase for checkout and to print a receipt of the purchases. In the present invention the receipt includes an identifier such as a date label, a bar code, or a QR code in either visible or invisible ink. When the customer approaches an exit portal, there is a primary barrier (such as an arm or a door) which prevents exit until opened. A scanner is positioned for the customer to use the receipt's identifier to selectively remove/open the primary barrier so that the customer may exit the building.

The use of gates or barriers is well known in the art and include that described in U.S. Pat. No. 7,918,191, entitled "Remotely Operable Gated Chute for Livestock" issued to Gibson on Apr. 5, 2011, and incorporated hereinto by reference.

As noted, a variety of identifiers or codes may be used in this context, including, but not limited to printed date, bar code, and QR codes. Ideally, these identifiers are unique to the date of the purchase and, further, are ideally unique to the particular receipt so that they can be used only once by the customer. To add further security, in one embodiment of the invention, the identifier is printed using an ink that is invisible to the human eye.

The reading of printed material is well known and includes: U.S. Pat. No. 4,262,589, entitled "Apparatus for Embossing and Printing Information on Charge Sales Slip" issued to Gebhardt on Apr. 21, 1981; and U.S. Pat. No. 5,602,936, entitled "Method of and Apparatus for Document Data Recapture" issued to Green et al. on Feb. 11, 1997; both of which are incorporated hereinto by reference.

The use of invisible ink and the like is well known in the art and includes U.S. Pat. No. 10,600,513, entitled "Medication Tracking" issued to Gitchell et al. on Mar. 24, 2020, incorporated hereinto by reference.

Bar code readers are well known to those of ordinary skill in the art and are described in such patents as: U.S. Pat. No. 11,036,948, entitled "Barcode-Scanning System Configured for both Data Validation and Data Formatting" issued to Lei et al. on Jun. 15, 2021; and U.S. Pat. No. 11,062,103, entitled "Digital Barcode Reader" issued to Zhao, et al. on Jul. 13, 2021; both of which are incorporated hereinto by reference.

QR code are an alternative to the barcode and are well known. An example include: U.S. Pat. No. 11,068,762, entitled "Dual Code Authentication Process" issued to Goldstein et al. on Jul. 20, 2021; incorporated hereinto by reference.

The preferred embodiment of the invention incorporates the use of a camera to generate an image of the incoming customer. Positioning of the camera is ideally made below a customer's face so that the full facial image is obtained and cannot be readily blocked by a hat.

This image is stored by the store and ideally a facial recognition is performed on the image.

The field and technology used in facial recognition is well known and includes: U.S. Pat. No. 11,068,697, entitled "Methods and Apparatus for Video-based Facial Recognition, electronic devices, and Storage Media" issued to Liu et al. on Jul. 20, 2021; and U.S. Pat. No. 11,074,431, entitled "Facial Recognition Device" issued to Yamada on Jul. 27, 2021; both of which are incorporated hereinto by reference.

In some embodiments, the exit portal is equipped with a secondary door which may be selectively closed behind the customer to confine the customer until law enforcement arrives. This is done when the customer attempts to shoplift items from the store.

While the exit portal is important to keep shoplifters from illegally removing goods, another aspect of this invention is the use of an entry portal as well. The entry portal is used to "screen" incoming customers to avoid allowing previous shoplifters from re-entering the store or even for denying entry to individuals who have used fraudulent credit cards or checks.

In this context, the entry portal uses a barrier to restrict free access into the store and an entry camera directed to an occupant of the entry portal and generating an electronic image thereof. A recording mechanism stores the image, facial recognition is performed and compared to a library of "undesirables". If the individual is one of the "undesirables", a message on a screen advises the individual: PLEASE TAKE YOUR BUSINESS ELSEWHERE.

The screen is also useful to direct the individual to raise their hat or face so that proper facial recognition may be made.

If no problems are encountered, the barrier is removed allowing access to the interior of the store.

In this manner, the system employs a data base of selected facial data points stored on a memory device allowing the facial recognition system to compare the current image against the data base of selected facial data points, and, maintain the entry barrier in a closed position if a match occurs between the current image and one of the selected facial data points for "undesirable" individuals.

For safety reasons, an override switch is located proximate to the register. This override switch opens the primary barrier of the exit portal and the primary barrier of the entry portal so that people may leave the building without hinderance. The override switch is also activated by the fire alarm.

In one embodiment of the invention, the entry portal and the exit portal are unified into a single unit and are supported by wheels. This allows, together with an anchoring mechanism, to move the entry/exit unified body through an opening of the store when the store is open for business and to withdraw the entry/exit unified body when the store is closed to business. The opening in the wall is then be sealed using a variety of techniques including the use of a rolling door. The anchor mechanism, for the unified unit, ideally engages with the floor of the store.

The invention, together with various embodiments thereof, will be explained in detail by the accompanying drawings and the following description thereof.

DRAWINGS IN BRIEF

FIGS. 2A and 2B are horizontal views of the entry and exit portals.

FIG. 3 is an informational flow diagram of the preferred embodiment of the invention.

DRAWINGS IN DETAIL

Figure 1:
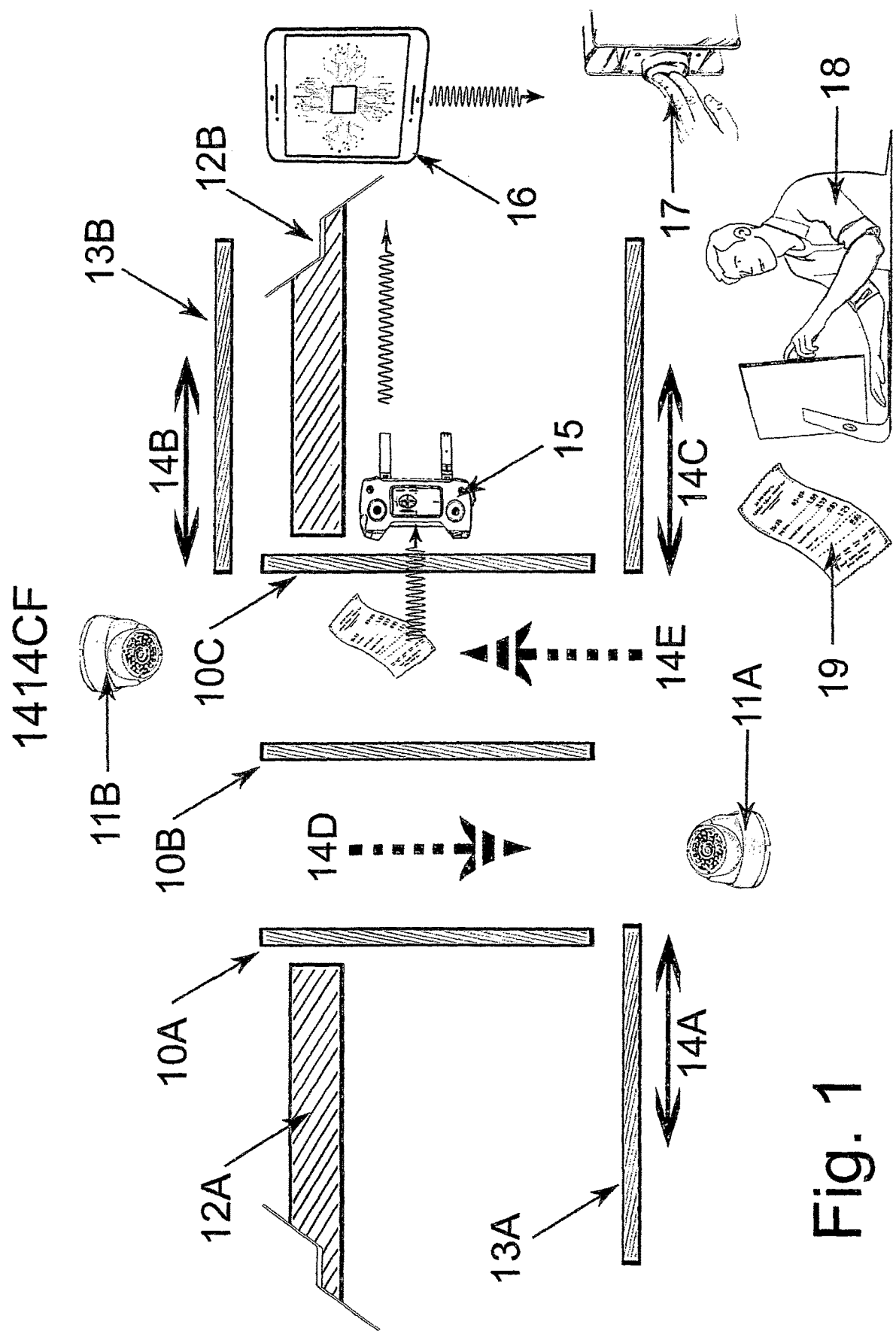
FIG. 1 is an overhead view of the preferred embodiment of the invention.

FIG. 1 is an overhead view of the preferred embodiment of the invention.

An opening between exterior walls 12A and 12B is used for ingress and egress from the store. Positioned in this opening, are panels 10A, 10B, and 10C which form two channels, one for ingress and one for egress from the store.

For egress, the customer (not shown) has obtained receipt 19 from the cash register 18. Barrier 13B has been moved to block egress as the customer passes as indicated by arrow 14E. Using receipt 19, the customer presents receipt 19 to reader 15 (positioned near a window on panel 10C). Reader 15, communicates with controller 16 which identifies the proper code (or lack thereof) and selectively move barrier 13B as indicated by arrow 14B. In this manner, a valid customer is given free access to leave the store while a shoplifter (without a receipt) is thwarted in their endeavors.

Camera 11B captures an image of the customer and communicates this image to the controller which may use facial recognition to identify the customer.

Emergency switch 17, ideally positioned near register 18, permits a store employee to cause all barriers to open in case of an emergency so that egress from the store is not hindered.

For ingress into the store, the customer enters between panels 10A and 10B as indicated by arrow 14D. As with egress, a camera 11A is used to capture an image of the entering customer for storage by controller 16 (possibly with facial recognition). Barrier 13A is typically left open but in some necessary situations, such as when the facial recognition identifies a previous thief, moves barrier 13A as indicated by arrow 14A to prevent entry.

Barriers 13A and 13B in this illustration are full or substantially full doors that slide (as indicated by arrows 14A, 14B, and 14C) to either open or close.

FIGS. 2A and 2B are views of the entry and exit portals.

Referring to FIG. 2A, the egress portion of the invention, looking as the customer would see the egress portion as they approach, are panels 10B and 10C forming a channel therebetween. Barrier 21B (an arm in this illustration) moves downward to block egress. The customer's image is captured by camera 11B. To move arm 21B, the customer presents his receipt to reader 15 which, if the proper code exists on the receipt, lifts arm 21B as indicated by arrow 22B.

The ode is ideally unique at least to the date and preferably to the individual purchase receipt.

The store's worker may also raise arm 21B should the need arise such as when the customer has not bought anything and then does not have a receipt, although in this situation, a "blank" receipt may be printed for the purpose of allowing egress.

FIG. 2B illustrates the ingress portion as seen by the customer seeking to enter the store between panels 10A and 10B. Camera 11A captures an image of the customer and, in one embodiment, performs facial recognition on the image to identify if the customer is someone that the store does not want to grant entry such as a former shoplifter, a writer of bad checks, has previously caused a disturbance in the store, or has used a fraudulent credit card in the past.

If the customer is a non-desirable, then arm 21A moves as indicated by arrow 22A to block entry and ideally a notice is displayed on screen 23. Screen 23 is also used to promote different sales items or for informational purposes such as hours of operation.

FIG. 3 is an informational flow diagram of the preferred embodiment of the invention.

Controller 16 receives the images from cameras 11A and 11B, performs facial recognition, and communicates the facial recognition data to data storage 30. Data storage 30 is used to identify customers who are undesirable as well as valued customers.

Controller 16 also communicates with the customer via screen 23 and opens/closes entry door 14A and exit door 14B.

Figure 4A:
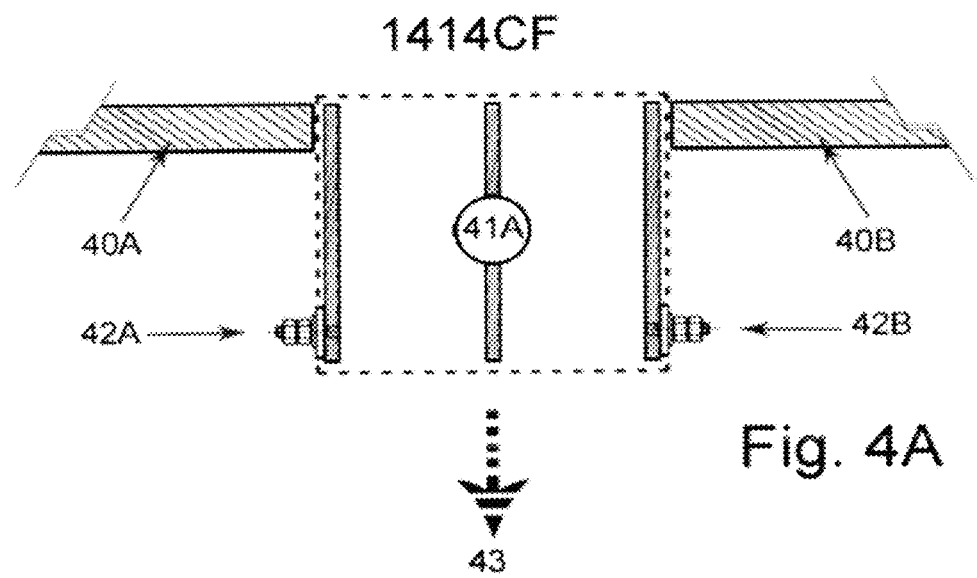
FIGS. 4A and 4B illustrate the movement of the entry/exit in an embodiment of the invention.
Figure 4B:
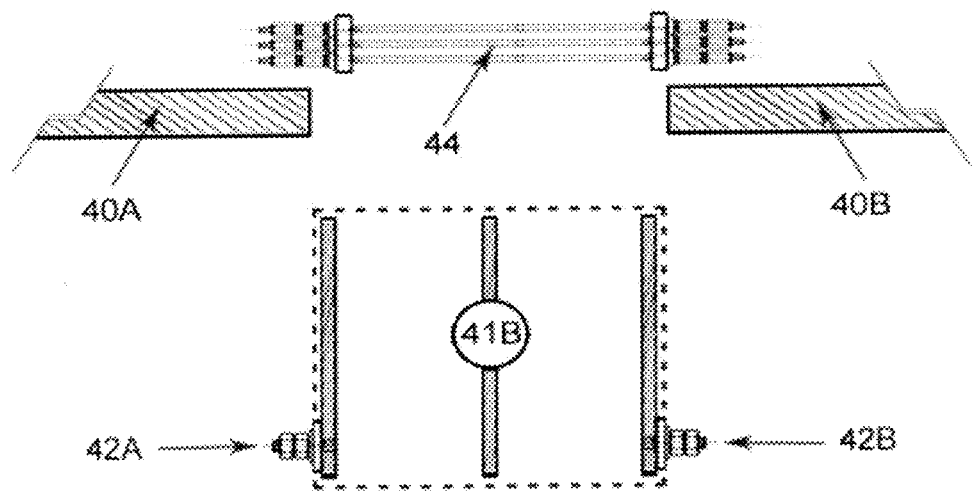

FIGS. 4A and 4B illustrate the movement of the entry/exit in an embodiment of the invention.

When the store is open for business, ingress/egress mechanism 41, as outlined above, is positioned between walls 40A and 40B. In this embodiment, ingress/egress mechanism 41 is a unified body. Latching bolts 42A and 42B are used to secure ingress/egress mechanism 41 in the position shown in FIG. 4A.

At store closing, FIG. 4B, the latching bolts 42A and 42B are released and the ingress/egress mechanism 41B, supported by wheels not shown, is pulled or rolled into the store and a rolling or security shutter/door 44 is used to securely cover the opening between wall 40A and 40B.

It is clear that the present invention provides for additional security from shoplifting.

What is claimed is:

1. An anti-shoplifting system for a store comprising:
   a) a register configured to process a purchase for checkout, said register providing a receipt of the purchase 9 made by a customer of the store with a printed identifier thereon;
   b) an exit portal for exiting the store, said portal having,
      1) A primary barrier selectively limiting access to an exterior of the store, and,
      2) a scanner being accessible to the customer, said scanner responsive to the printed identifier when presented by the customer on the receipt for selectively removing the primary barrier;

c) an entry portal for entering the store and having a primary entry barrier limiting access to an interior of the store;
d) an entry camera directed to an occupant of the entry portal and generating an electronic image thereof; and,
a) a recording mechanism adapted to store the electronic image from the entry camera in a database of facial data points;
b) a facial recognition system adapted to analyze the electronic image from the entry camera and compare a current image against the data base of selected facial data points;
c) a barrier removal mechanism being responsive to the facial recognition system to selectively remove the primary barrier from restricting access to the interior of the store or maintain the entry barrier in a closed position if a match occurs between the current image and one of the selected facial data points.

2. The anti-shoplifting system for a store according to claim 1, wherein the identifier is a printed date on the receipt.

3. The anti-shoplifting system for a store according to claim 1, wherein the identifier is invisible to the human eye.

4. The anti-shoplifting system for a store according to claim 1, wherein the identifier is a barcode.

5. The anti-shoplifting system for a store according to claim 1, wherein the identifier is a unique code.

6. The anti-shoplifting system for a store according to claim 1, further including,
   a) a camera directed to an occupant of the exit portal and generating an electronic image thereof; and,
   b) a recording mechanism adapted to store the electronic image.

7. The anti-shoplifting system for a store according to claim 6, further including a facial recognition system adapted to analyze the electronic image.

8. The anti-shoplifting system for a store according to claim 6, wherein the exit portal includes a secondary barrier positioned to restrict an occupant from entry into the store.

9. The anti-shoplifting system for a store according to claim 6, further including an override switch located proximate to the register, said override switch adapted to open the primary barrier of the exit portal.

10. An anti-shoplifting system for a store comprising:
    a) a register configured to process a purchase for checkout, said register providing a receipt of the purchases made and an identifier;
    b) an exit portal for exiting the store, said exit portal having, a primary barrier limiting access to an exterior of the store, and, a scanner responsive to the identifier on the receipt for selectively removing the primary barrier from restricting access to the exterior of the store, and a camera directed to an occupant of the exit portal and generating an exit electronic image thereof the exit portal also having a secondary barrier adapted to selectively confine an occupant between the primary barrier and secondary barrier; and,
    c) an entry portal for entering the store having an entry camera directed to an occupant of the entry portal and generating an entry electronic image thereof;
    d) wherein the exit portal and the entry portal compose a unified body;
    e) further including wheels for supporting the unified body; and,
    f) an anchor mechanism adapted to selectively secure the unified body to a floor.

11. The anti-shoplifting system for a store according to claim 10, further including,
    a) an entry facial recognition system adapted to analyze the entry electronic image; and,
    b) an exit facial recognition system adapted to operate on the exit electronic image.

* * * * *